United States Patent
Boll et al.

(10) Patent No.: US 7,776,308 B2
(45) Date of Patent: Aug. 17, 2010

(54) APPARATUS AND METHOD FOR OPERATING THE APPARATUS FOR CONTINUOUSLY RECOVERING SULFUR FROM GAS CONTAINING $H_2S$

(75) Inventors: Walter Boll, Frankfurt am Main (DE); Wofgang Nehb, Frankfurt am Main (DE); Eckhard Jüngst, Frankfurt am Main (DE)

(73) Assignee: LURGI GmbH, Frankfurt (DE)

( * ) Notice: Subject to any disclaimer, the term of this patent is extended or adjusted under 35 U.S.C. 154(b) by 0 days.

(21) Appl. No.: 11/914,331

(22) PCT Filed: Mar. 18, 2006

(86) PCT No.: PCT/EP2006/002514

§ 371 (c)(1),
(2), (4) Date: Jun. 26, 2008

(87) PCT Pub. No.: WO2006/122599

PCT Pub. Date: Nov. 23, 2006

(65) Prior Publication Data

US 2008/0311030 A1    Dec. 18, 2008

(30) Foreign Application Priority Data

May 13, 2005    (DE) ................ 10 2005 022 164

(51) Int. Cl.
*C01B 17/027*    (2006.01)
*B01D 53/52*    (2006.01)

(52) U.S. Cl. ................ 423/576.2; 423/220; 423/242.1

(58) Field of Classification Search ................ 423/210, 423/220, 222, 242.1, 244.01–244.04, 244.09, 423/215.5, 511, 561.1, 563, 564, 567.1, 571, 423/572, 573.1, 574.1
See application file for complete search history.

(56) References Cited

U.S. PATENT DOCUMENTS

| | | | | |
|---|---|---|---|---|
| 4,426,369 A | * | 1/1984 | Palm | 423/574.1 |
| 4,980,146 A | * | 12/1990 | Kvasnikoff et al. | 423/574.1 |
| 5,352,422 A | | 10/1994 | Van Den Brink et al. | |
| 5,897,850 A | * | 4/1999 | Borsboom et al. | 423/576.2 |
| 6,083,471 A | | 7/2000 | Philippe et al. | |
| 6,946,111 B2 | * | 9/2005 | Keller et al. | 423/576.2 |
| 2005/0180914 A1 | * | 8/2005 | Keller et al. | 423/576.8 |

FOREIGN PATENT DOCUMENTS

| | | |
|---|---|---|
| EP | 0672618 A | 9/1995 |
| WO | 03082455 A | 10/2003 |

OTHER PUBLICATIONS

English Language Abstract to EP 0672618, Sep. 20, 1995.

\* cited by examiner

*Primary Examiner*—Timothy C Vanoy
*Assistant Examiner*—Richard M Rump
(74) *Attorney, Agent, or Firm*—Norris, McLaughlin & Marcus

(57) ABSTRACT

In an apparatus for continuously recovering sulfur from a gas stream containing 0.1 to 3.0 vol-% $H_2S$, further gaseous sulfur compounds and sulfur, the gas stream first is passed over a reduction stage consisting of hydrogenation catalyst and then over a selective oxidation stage consisting of oxidation catalyst. To reduce the amount of apparatus involved, it is provided to arrange the reduction stage and the selective oxidation stage in a reaction tank and to leave a space for introducing a gaseous cooling medium into the gas stream between the two stages.

7 Claims, 1 Drawing Sheet

Figure 1:
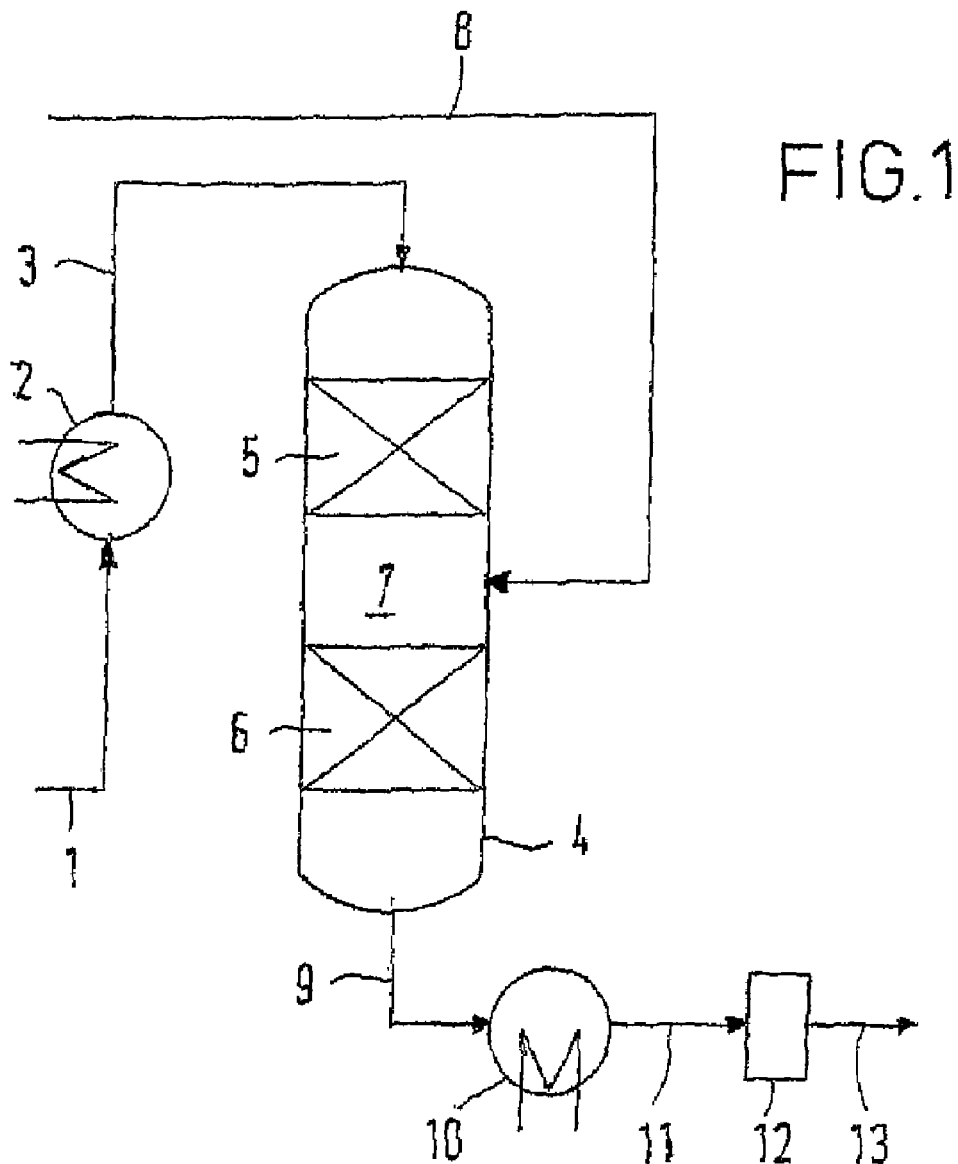

APPARATUS AND METHOD FOR OPERATING THE APPARATUS FOR CONTINUOUSLY RECOVERING SULFUR FROM GAS CONTAINING H₂S

This application is a 371 application of PCT/EP2006/002514 filed Mar. 18, 2006, which claims priority to the German application DE 10 2005 022 164.5 filed May 13, 2005.

This invention relates to an apparatus and a method for operating the apparatus for continuously recovering sulfur from gas containing 0.1 to 3.0 vol-%, preferably 0.5 to 1.5 vol-% $H_2S$ and further gaseous sulfur compounds such as $SO_2$, COS and $CS_2$ as well as sulfur, comprising a reduction stage, in which the gaseous sulfur compounds and the sulfur can be reduced to $H_2S$ over a fixed-bed zone formed of a bed of hydrogenation catalyst, and a selective oxidation stage, in which $H_2S$ can be converted to sulfur over a fixed-bed zone formed of a bed of a selective oxidation catalyst.

The Claus process has long since been an important process for recovering sulfur from feed gases containing $H_2S$. The plant for performing the Claus process generally consists of a thermal stage formed by a combustion chamber and a plurality of, preferably two or three, series-connected downstream catalytic stages each equipped with a fixed-bed catalyst. In the Claus process, part of the $H_2S$ is burnt to obtain $SO_2$ according to the following equation:

$$H_2S + 1.5 O_2 \rightarrow SO_2 + H_2O \quad [1]$$

The rest of the unreacted $H_2S$ reacts with the $SO_2$ formed according to the following equation:

$$2H_2S + SO_2 \leftrightarrow 3S + 2H_2O \quad [2]$$

to obtain sulfur and $H_2O$.

In the thermal stage and in the catalytic stages, which each consist of a catalytic reactor, an intermediate superheater and a sulfur condenser, the conversion to sulfur is effected, which is, however, thermodynamically limited and, as experience has shown, ends with a sulfur recovery of about 94 to 98%, so that certain amounts of $H_2S$ and $SO_2$ remain in the process gas.

EP-B-1115472 describes a process for recovering sulfur from gases containing $H_2S$, in which in an oxidation stage part of the $H_2S$ contained in a gas stream is oxidized with oxygen to obtain $SO_2$ and subsequently is reacted in two downstream catalytic stages according to the following Claus equation:

$$2H_2S + SO_2 \leftrightarrow 3S + 2H_2O \quad [3]$$

The $SO_2$ contained in the product gas leaving the last catalytic stage is reduced catalytically over a fixed bed of a hydrogenation catalyst, which in gas flow direction is arranged in the last catalytic stage, and subsequently the $H_2S$ contained in the product gas leaving the last catalytic stage is selectively oxidized to obtain sulfur after condensating out the sulfur obtained. The catalytic stages are operated with an excess of $H_2S$, based on the above-mentioned stoichiometric equation [3]. A small part is branched off from the combustion air supplied to the thermal stage provided upstream of the catalytic stages and is added to the reheated product gas leaving the last catalytic stage. By means of this process, a sulfur recovery of more than 99.3 to 99.7% should be achieved, based on the gas entering a Claus plant in which the major amount of $H_2S$ and $SO_2$ is converted to sulfur. Among other things, this process is based on the hydrogenation of $SO_2$ left in the tail gas of the Claus process. The tail gas leaving the first catalytic reactor of a Claus stage is supplied to a second catalytic reactor, in which under a normal catalyst bed for the Claus reaction, which generally consists of $Al_2O_3$, a further catalyst bed, which consists of metals of groups VI and VIII of the Periodic Table, preferably of cobalt-molybdenum and nickel-molybdenum, is provided for the reduction of $SO_2$ to S and $H_2S$. $H_2$ and CO, which likewise are contained in the tail gas, react with $SO_2$ to obtain $H_2S$ and sulfur. In a selective oxidation stage, the $H_2S$ contained in the tail gas leaving the reduction stage is converted to sulfur.

It is the object of the present invention to improve the above-described apparatus for recovering sulfur from a gas stream containing 0.1 to 3.0 vol-% $H_2S$ and further gaseous sulfur compounds as well as sulfur, in particular from the tail gas stream of a Claus plant, by means of a hydrogenation stage and a downstream selective oxidation stage, in particular with regard to a lower expenditure.

This object is solved by a reaction tank, in whose first portion in gas flow direction the fixed-bed zone formed of a hydrogenation catalyst is provided and in whose second portion in gas flow direction the fixed-bed zone formed of a selective oxidation catalyst is provided, wherein a space for introducing a gaseous cooling medium containing the required atmospheric oxygen into the gas stream is provided between the fixed-bed zones. The reaction tank can be arranged vertically or horizontally with respect to its principal axis.

In accordance with the particular embodiment of the invention, the selective oxidation catalyst consists of iron oxide deposited on silicon carbide particles serving as carrier, wherein the iron content of the oxidation catalyst preferably is 0.5 to 10 wt-%. With this catalyst, a really positive effect can be achieved.

For operating the apparatus of the invention it is necessary that the gas stream introduced into the fixed-bed zone consisting of a hydrogenation catalyst first is heated to a temperature of 160 to 280° C., preferably 180 to 240° C., and the gas stream leaving this fixed-bed zone with a temperature of 200 to 320° C. is cooled to a temperature of 180 to 250° C. in the space existing between this fixed-bed zone and the fixed-bed zone formed of a selective oxidation catalyst by introducing a gaseous cooling medium into the gas stream.

According to a further feature of the invention, air is used as cooling medium, preferably with a three- to tenfold excess, in particular with a five- to eightfold excess. It is also possible to replace part of the air by nitrogen or steam or process gas or water droplets dispersed in the air. These cooling media provide for a good cooling of the gas stream without impairing the selectivity.

Expediently, the gas stream leaving the selective oxidation catalyst is cooled to a temperature of 120 to 160° C. upon leaving the reaction tank, in order to condense the sulfur obtained in the preceding process step.

The invention is illustrated in the drawing by way of example with reference to process flow diagrams and will subsequently be explained in detail with reference to embodiments set forth in Tables I, II and III.

In the Drawing

Figure 2:
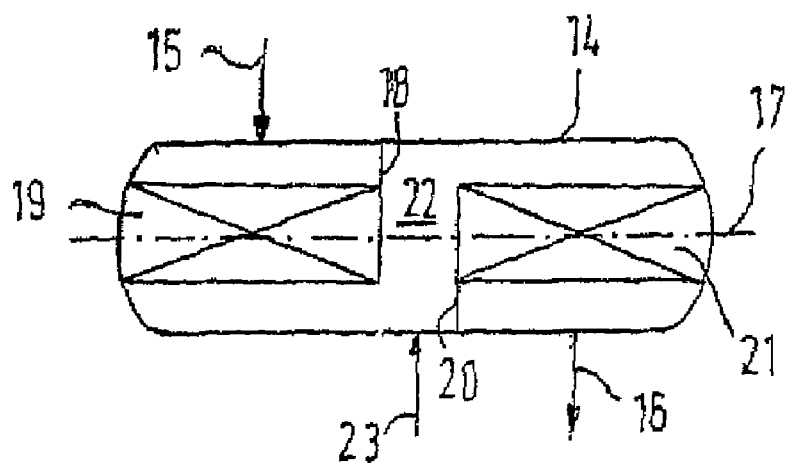

FIG. 1 shows a process flow diagram with vertically arranged reaction tank, and FIG. 2 shows a schematic representation of a horizontally arranged reaction tank.

Via conduit (1), the tail gas stream discharged from a non-illustrated plant for recovering sulfur according to the Claus process, which has a temperature of 140° C. and is composed of $H_2S$, $SO_2$, COS, $CS_2$, CO, $CO_2$, $H_2$, $H_2O$, $N_2$ and "S" ("S" means "elementary sulfur") according to Tables I, II and III, is heated to a temperature of 225° C. (Tables I, II) and 228° C. (Table III) in a heat exchanger (2) and charged via conduit (3) to the top of the reaction tank (4), in whose first portion in flow direction a fixed-bed zone (5) formed of a bed of hydrogenation catalyst is provided and in whose second portion in flow direction a fixed-bed zone (6) for selective oxidation is provided, which is formed of a bed of $H_2S$ direct catalyst. In the space (7) existing between the two fixed-bed zones (5, 6), air having a temperature of 70° C. is introduced into the gas stream via conduit (8). In this way, the product gas stream leaving the first fixed-bed zone (5) provided in flow direction with a temperature of 260° C. is cooled to a temperature of 245° C. (Tables I, III) and 235° C. (Table II). The product gas stream leaving the second fixed-bed zone (6) provided in flow direction with a temperature of 288° C. (Tables I, III) and 279° C. (Table II) is introduced via conduit (9) into a heat exchanger (10) and subsequently via conduit (11) into a separator (12), in which the sulfur contained in the product gas stream is separated, and is then discharged from the process via conduit (13). The product gas stream leaving the separator (12) has a temperature of 130° C. The temperatures indicated can vary by +/−5° C.

In the embodiment illustrated in Table (I), 97.9% of a feed gas containing 70 vol-% $H_2S$ have been converted to sulfur by means of the Claus process. The remaining tail gas, which upon entering the hydrogenation stage has the composition indicated in Table (I), is passed through the apparatus designed in accordance with the invention, whereby more sulfur is recovered, so that a total sulfur recovery value of 99.48% is obtained.

The embodiment set forth in Table (II) represents a variant of the embodiment in accordance with Table (I). It is demonstrated that the temperature in the selective oxidation stage can be controlled by changing the air quantity.

The embodiment in accordance with Table (III) refers to the tail gas obtained in the Claus process, in which 96.21% of a feed gas containing 50 vol-% $H_2S$ are converted to sulfur. By employing the invention, more sulfur can be recovered, so that a total conversion of 99.35% is achieved.

In the horizontally arranged reaction tank (14), which is schematically illustrated in FIG. 2, a heated tail gas stream is supplied via the shell through conduit (15) to the first portion of the reaction tank (14), and a product gas stream is withdrawn via the shell through conduit (16) from the second portion of the reaction tank (14). In the first portion, a fixed-bed zone (19) formed of a bed of hydrogenation catalyst is provided between the end face of the reaction tank (14) and a wall (18) disposed vertical to its principal axis (17) and provided with a segment-shaped or sector-shaped aperture. In the second portion, a fixed-bed zone (21) formed of a bed of a selective oxidation catalyst is provided between the back of a reaction tank (14) and a wall (20) extending vertical to the principal axis and having a segment-shaped or sector-shaped aperture. Between the two walls (18, 20), a space (22) traversed by a gas flow exists, in which a cooling medium is introduced into the gas stream via the shell through conduit (23).

The advantages achieved with the invention in particular can be seen in that a reaction tank includes hydrogenation and oxidation stages, and by cooling the product gas stream leaving the fixed-bed hydrogenation catalyst, a reduction of temperature is possible without using a heat exchanger.

TABLE I

Example 1: 70 vol-% $H_2S$ in the gas to the Claus plant (182 kmol/h $H_2S$)

|  |  | Hydrogenation inlet | Hydrogenation outlet | Air | Sel. oxidation inlet | Sel. oxidation outlet | After S cond. |
|---|---|---|---|---|---|---|---|
| $H_2S$ | [kmol/h] | 2.97 | 5.34 |  | 5.34 | 0.53 | 0.53 |
| $SO_2$ | " | 1.48 | 0.00 |  | 0.00 | 0.00 | 0.00 |
| COS | " | 0.36 | 0.00 |  | 0.00 | 0.00 | 0.00 |
| $CS_2$ | " | 0.11 | 0.00 |  | 0.00 | 0.00 | 0.00 |
| CO | " | 9.92 | 0.13 |  | 0.13 | 0.13 | 0.13 |
| $CO_2$ | " | 60.00 | 70.25 |  | 70.25 | 70.25 | 70.25 |
| $H_2$ | " | 13.86 | 18.88 |  | 18.88 | 18.88 | 18.88 |
| $H_2O$ | " | 196.91 | 189.52 | 1.76 | 191.28 | 196.09 | 196.09 |
| $N_2$ | " | 336.52 | 336.52 | 45.08 | 381.60 | 381.60 | 381.60 |
| $O_2$ | " | 0.00 | 0.00 | 12.00 | 12.00 | 9.60 | 9.60 |
| "S" |  | 0.31 | 0.00 | 0 | 0.00 | 4.82 | 0.38 |
| Total | [kmol/h] | 622.44 | 620.64 | 58.84 | 679.48 | 681.90 | 677.46 |
| Temp. | [° C.] | 225 | 260 | 70 | 245 | 288 | 130 |
|  |  | η (Claus) = 97.06% |  |  |  |  | η (total) = 99.48% |

TABLE II

Example 1a: 70 vol-% $H_2S$ in the gas to the Claus plant (182 kmol/h $H_2S$)

|  |  | Hydrogenation inlet | Hydrogenation outlet | Air | Sel. oxidation inlet | Sel. oxidation outlet | After S cond. |
|---|---|---|---|---|---|---|---|
| $H_2S$ | [kmol/h] | 2.97 | 5.34 |  | 5.34 | 0.53 | 0.53 |
| $SO_2$ | " | 1.48 | 0.00 |  | 0.00 | 0.00 | 0.00 |
| COS | " | 0.36 | 0.00 |  | 0.00 | 0.00 | 0.00 |
| $CS_2$ | " | 0.11 | 0.00 |  | 0.00 | 0.00 | 0.00 |
| CO | " | 9.92 | 0.13 |  | 0.13 | 0.13 | 0.13 |
| $CO_2$ | " | 60.00 | 70.25 |  | 70.25 | 70.25 | 70.25 |
| $H_2$ | " | 13.86 | 18.88 |  | 18.88 | 18.88 | 18.88 |
| $H_2O$ | " | 196.91 | 189.52 | 2.94 | 192.46 | 197.27 | 197.27 |

TABLE II-continued

Example 1a: 70 vol-% H₂S in the gas
to the Claus plant (182 kmol/h H$_2$S)

|  |  | Hydrogenation inlet | Hydrogenation outlet | Air | Sel. oxidation inlet | Sel. oxidation outlet | After S cond. |
|---|---|---|---|---|---|---|---|
| $N_2$ | " | 336.52 | 336.52 | 75.28 | 411.80 | 411.80 | 411.80 |
| $O_2$ | " | 0.00 | 0.00 | 20.00 | 20.00 | 17.60 | 17.60 |
| "S" |  | 0.31 | 0.00 | 0 | 0.00 | 4.82 | 0.38 |
| Total | [kmol/h] | 622.44 | 620.64 | 98.22 | 718.86 | 721.28 | 716.84 |
| Temp. | [° C.] | 225 | 260 | 70 | 235 | 279 | 130 |
|  |  | η (Claus) = 97.06% |  |  |  |  | η (total) = 99.48% |

TABLE III

Example 2: 50 vol-% H$_2$S in the gas
to the Claus plant (130 kmol/h H$_2$S)

|  |  | Hydrogenation inlet | Hydrogenation outlet | Air | Sel. oxidation inlet | Sel. oxidation outlet | After S cond. |
|---|---|---|---|---|---|---|---|
| $H_2S$ | [kmol/h] | 2.53 | 4.81 |  | 4.81 | 0.48 | 0.48 |
| $SO_2$ | " | 1.26 | 0.00 |  | 0.00 | 0.00 | 0.00 |
| COS | " | 0.53 | 0.01 |  | 0.01 | 0.01 | 0.01 |
| $CS_2$ | " | 0.11 | 0.00 |  | 0.00 | 0.00 | 0.00 |
| CO | " | 8.07 | 0.16 |  | 0.16 | 0.16 | 0.16 |
| $CO_2$ | " | 113.66 | 122.20 |  | 122.20 | 122.20 | 122.20 |
| $H_2$ | " | 5.67 | 9.52 |  | 9.52 | 9.52 | 9.52 |
| $H_2O$ | " | 150.46 | 144.33 | 1.62 | 145.95 | 150.28 | 150.28 |
| $N_2$ | " | 257.45 | 257.45 | 41.31 | 298.76 | 298.76 | 298.76 |
| $O_2$ | " | 0.00 | 0.00 | 11.00 | 11.00 | 8.84 | 8.84 |
| "S" |  | 0.30 | 0.00 | 0 | 0.00 | 4.31 | 0.38 |
| Total | [kmol/h] | 540.04 | 538.48 | 53.93 | 592.41 | 594.56 | 590.63 |
| Temp. | [° C.] | 228 | 260 | 70 | 245 | 288 | 130 |
|  |  | η (Claus) = 96.21% |  |  |  |  | η (total) = 99.35% |

The invention claimed is:

1. A method for continuously recovering sulphur from a gas stream, said method comprising:
   (a) introducing a gas stream containing 0.1 to 3.0 vol-%, H$_2$S and further gaseous sulphur compounds including SO$_2$, COS, CS$_2$ and elemental sulphur into a reaction tank, said reaction tank comprising a first fixed-bed zone containing hydrogenation catalyst and a second fixed-bed zone containing selective oxidation catalyst, wherein a space exists between the first and second fixed bed zones;
   (b) passing the gas stream over the first fixed-bed zone to reduce the gaseous sulphur compounds and the elemental sulphur to H$_2$S over the hydrogenation catalyst, wherein the gas stream passed over the first fixed bed zone is heated to a temperature of between 160 to 280° C.;
   (c) passing the gas stream leaving the first fixed-bed zone to the second fixed-bed zone in which H$_2$S is converted to sulphur over the selective oxidation catalyst and wherein in the space between the first and second fixed-bed zones a gaseous cooling medium containing atmospheric oxygen is introduced into the gas stream.

2. The method according to claim 1, wherein the gas stream leaving the first fixed-bed zone is cooled to a temperature of between 180 to 250° C. in the space between the first and second fixed-bed zones by introducing the gaseous cooling medium into the gas stream.

3. The method according to claim 1, wherein air is used as the gaseous cooling medium.

4. The method according to claim 1, wherein, an air-nitrogen mixture, an air-steam mixture, an air-process-gas mixture, a mixture of air with water droplets dispersed therein, or mixtures thereof is used as the gaseous cooling medium.

5. The method according to claim 1, wherein the gas stream leaving the second fixed-bed is cooled to a temperature of 120 to 180° C.

6. The method according to claim 1 wherein the gas stream contains 0.5 to 1.5 vol. % H$_2$S.

7. The method according to claim 1 wherein the hydrogenation catalyst is heated to a temperature of about 180° to 240° C.

* * * * *